United States Patent
Wantling

(10) Patent No.: US 8,076,006 B2
(45) Date of Patent: Dec. 13, 2011

(54) TRIGLYCERIDE COMPOSITIONS USEFUL FOR PREPARING COMPOSITE PANELS AND APPLICATIONS THEREOF

(75) Inventor: Steven J. Wantling, Hoover, MS (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 0 days.

(21) Appl. No.: 12/360,655

(22) Filed: Jan. 27, 2009

(65) Prior Publication Data
US 2010/0190022 A1 Jul. 29, 2010

(51) Int. Cl.
*B22B 13/00* (2006.01)
*B22B 21/00* (2006.01)
*B22B 21/02* (2006.01)
*B22B 9/02* (2006.01)
*B01F 3/12* (2006.01)

(52) U.S. Cl. ............... 428/484.1; 428/105; 428/106; 428/292.4; 428/485; 428/533; 428/534; 428/535; 428/537.1; 428/537.5; 428/537.7; 428/703; 106/220; 106/221; 106/222; 106/224; 106/227; 106/229; 106/230; 106/236; 106/243; 106/244; 106/245; 106/252; 106/264; 106/265; 106/267; 106/268; 106/270; 106/819; 106/660; 106/665; 427/392; 427/393; 427/393.4; 427/396; 427/397; 427/393.6; 524/275; 524/276; 524/277; 524/313

(58) Field of Classification Search .............. 428/532, 428/536; 427/408
See application file for complete search history.

(56) References Cited

U.S. PATENT DOCUMENTS

| | | | |
|---|---|---|---|
| 5,405,932 A * | 4/1995 | Bender et al. ............ 528/104 |
| 5,468,405 A * | 11/1995 | Klein et al. ............ 508/486 |
| 5,607,633 A | 3/1997 | Sleeter et al. |
| 5,637,657 A * | 6/1997 | Anton ............ 525/445 |
| 5,942,058 A | 8/1999 | Sleeter et al. |
| 6,121,398 A | 9/2000 | Wool et al. |
| 6,201,053 B1 * | 3/2001 | Dieckmann et al. ........ 524/301 |
| 6,277,310 B1 * | 8/2001 | Sleeter ............ 264/13 |
| 6,291,409 B1 * | 9/2001 | Kodali et al. ............ 508/491 |
| 6,312,826 B1 * | 11/2001 | Shogren ............ 428/507 |
| 6,576,175 B1 * | 6/2003 | Roos ............ 264/109 |
| 6,811,824 B2 * | 11/2004 | Hassan et al. ............ 427/391 |
| 6,825,242 B2 | 11/2004 | Sulzbach et al. |
| 6,890,967 B2 | 5/2005 | Sulzbzch et al. |
| 7,071,248 B2 | 7/2006 | Chen et al. |
| 7,267,743 B2 * | 9/2007 | Borsinger et al. ............ 162/5 |
| 7,294,189 B2 * | 11/2007 | Wantling ............ 106/164.3 |
| 7,776,928 B2 * | 8/2010 | Borsinger et al. ............ 516/77 |
| 2002/0103091 A1 * | 8/2002 | Kodali ............ 508/485 |
| 2003/0134927 A1 | 7/2003 | Sulzbach et al. |
| 2003/0134928 A1 | 7/2003 | Sulzbach et al. |
| 2003/0195178 A1 * | 10/2003 | Li ............ 514/171 |
| 2004/0037904 A1 * | 2/2004 | Hakansson ............ 424/757 |
| 2004/0076745 A1 * | 4/2004 | Hassan et al. ............ 427/155 |
| 2004/0140055 A1 | 7/2004 | Chen et al. |
| 2005/0131103 A1 * | 6/2005 | Hassan et al. ............ 523/160 |
| 2005/0269728 A1 * | 12/2005 | Roos ............ 264/109 |
| 2006/0196391 A1 * | 9/2006 | Hassan et al. ............ 106/271 |
| 2006/0246149 A1 | 11/2006 | Buchholz et al. |
| 2006/0283356 A1 * | 12/2006 | Donlon et al. ............ 106/660 |
| 2006/0289138 A1 * | 12/2006 | Borsinger et al. ............ 162/172 |
| 2007/0068642 A1 * | 3/2007 | Borsinger et al. ............ 162/172 |
| 2007/0098903 A1 | 5/2007 | Hurd et al. |
| 2009/0272292 A1 * | 11/2009 | Wantling ............ 106/162.5 |
| 2010/0186627 A1 * | 7/2010 | Wantling et al. ............ 106/203.3 |

* cited by examiner

*Primary Examiner* — Vivian Chen

(57) ABSTRACT

Composite panels may be prepared using a moisture resistance additive having a formulation that includes a triglyceride having a saponification value of at least 150 and an iodine value of at least 35. The additive may be used in the form of a water emulsion. The water emulsion may be prepared by dispersing the components of the additive formulation under conditions sufficient to at least partially saponify the triglyceride. The moisture resistance additive can impart resistance to moisture absorption and thickness swelling to composite panels prepared therewith.

14 Claims, No Drawings

TRIGLYCERIDE COMPOSITIONS USEFUL FOR PREPARING COMPOSITE PANELS AND APPLICATIONS THEREOF

BACKGROUND OF THE INVENTION

1. Field of the Invention

The invention relates to additives for use in preparing composite panels. The invention particularly relates to additives useful for imparting resistance to moisture absorption and swelling to composite panels.

2. Background of the Art

Composite boards, also known in the art as composite panels may be made from wood and have the features of natural wood. When manufacturing composite boards, such as medium density fiber (MDF) boards or particle boards, wood is first ground into wood chips of a desired size. The wood chips are then mixed with a binder in a blender until uniformly blended.

The homogenized mixture is then extruded or molded into a desired shape. The composite board may be coated with polyvinyl chloride (PVC), melamine, metal, foil, impregnated paper, wood veneer that is stained and sealed or polyester to make the composite board decorative and wear resistant and to provide other properties. In some applications, the hardened composite board is then cut to a desired shape and size, and then further processed by cutting, drilling, or edging to create a component part. The composite boards may be used as cabinets, molding, storage units, desks, or other products.

During the last decade oriented strand board (OSB), another form of composite panels, has become a particularly important wood product in the home construction industry. Since its appearance in 1978, OSB has become the most rapidly growing wood-based composite product. OSB is primarily used as a structural panel, which in the past was dominated by softwood plywood.

Still another form of composite panels are the so called "gypsum boards." Conventional gypsum wallboard or drywall is typically manufactured from a gypsum plaster slurry which is put between two layers of paper. More specifically, in the conventional method, a wet slurry of gypsum is poured on a conveyor between two layers of paper, and the slurry is allowed a certain amount of time to set. In gypsum wallboard, the two layers of paper contain the slurry and provide the tensile strength required in installation and use. Gypsum board composite panels may include cellulose and other materials in addition to gypsum.

It would be desirable in the art of making composite panels to increase the moisture resistance of all such panels.

SUMMARY OF THE INVENTION

In one aspect, the invention is a composite panel prepared using a moisture resistance additive useful for preparing composite panels, the moisture resistance additive including a triglyceride having a saponification value of at least 150 and an iodine value of at least 35.

In another aspect, the invention is a method for preparing composite panels including introducing a moisture resistance additive useful for preparing composite panels, the moisture resistance additive including a triglyceride having a saponification value of at least 150 and an iodine value of at least 35, into a wet panel production process.

In still another aspect, the invention is a moisture resistance additive useful for preparing composite panels, the moisture resistance additive including a triglyceride having a saponification value of at least 150 and an iodine value of at least 35.

Another aspect of the invention is a moisture resistance additive including an emulsion wherein the emulsion is prepared using a formulation including a triglyceride having a saponification value of at least 150 and an iodine value of at least 35; a hydrocarbon wax; a linear $C_{12}$ to $C_{22}$ fatty acid; and a compound or compounds selected from the group consisting of an amine, an inorganic base, and mixtures thereof. The emulsion is prepared under conditions sufficient to disperse the emulsion components and at least partially saponify the triglyceride.

DESCRIPTION OF THE PREFERRED EMBODIMENTS

One embodiment of the invention is a composite panel prepared using a moisture resistance additive useful for preparing composite panels, the moisture resistance additive including a triglyceride having a saponification value of at least 150 and an iodine value of at least 35. Triacylglycerides (also termed triglycerides) are chemically defined as glycerol esters of fatty acids. Triglycerides useful with the present invention include, but are not limited to Rapeseed oil; Menhaden oil; Corn oil; Olive oil; Cacao oil; Soy oil; Linseed oil; Cottonseed oil; Lard; Mutton Tallow; Peanut oil; Horse Oil; Beef Tallow; Palm Oil; Butter, Palm Kernel Oil; and Coconut Oil. Any triglyceride may be used as long as has saponification and iodine values of at least 150 and 35 respectively.

When the triglycerides have too much unsaturation, they may be treated in any way known to be useful to those of ordinary skill in the art to reduce the extent of unsaturation. For example, the triglycerides may be subjected to a degree of hydrogenation.

In some embodiments, it may be desirable that the iodine value may be greater than 35. For example, in some embodiments, the iodine value may be greater than about 45. In another embodiment, the iodine number may be greater than about 55. In some embodiments the iodine number is from about 50 to about 56.

In some embodiments, the saponification value for the triglycerides is greater than 150. For example in some embodiments the saponification value is greater than about 170. In other embodiments, the saponification value is from about 170 to 260 and in still other embodiments, the saponification value is from about 185 to about 200.

An iodine value of a triglyceride may be determined in the following manner. The amount of halogen absorbed by a sample of the triglyceride is measured while the halogen acts on the sample. Then, the amount of halogen absorbed is converted to iodine and expressed in grams per 100 g of the sample. The iodine value is grams of iodine absorbed by 100 grams of fat, and the degree of unsaturation of fatty acid in the sample increases with the iodine value. A chloroform or carbon tetrachloride solution is prepared as a sample, and an alcohol solution of iodine and mercuric chloride or a glacial acetic acid solution of iodine chloride is added to the sample. After the sample is allowed to stand, the iodine that remains without causing any reaction is titrated with a sodium thiosulfate standard solution, thus calculating the amount of iodine absorbed. Any method of determining an iodine value that corresponds to the known standard methods of measuring iodine values may be practiced with the invention.

A saponification value is the milligrams of potassium hydroxide (KOH). required to saponify 1 g sample and corresponds to the sum of an acid value and an ester value. When the saponification value is measured in the practice of the invention, a sample may be saponified with approximately 0.5N potassium hydroxide in an alcohol solution, and then excess potassium hydroxide may be titrated with 0.5N hydrochloric acid. The saponification value of a compound increases as the number of ester groups within the compound is increased. Any method of determining a saponification value that corresponds to the known standard methods of measuring saponification values may be practiced with the invention.

In the practice of the invention, in one embodiment, the moisture resistance additive comprising a triglyceride may be in the form of an aqueous emulsion. The emulsion may include other components besides water and the triglyceride. The additional components may include, but are not limited to: hydrocarbon waxes, linear $C_{12}$ to $C_{22}$ fatty acids, an inorganic base, an amine, and mixtures thereof.

When a hydrocarbon wax is used, it may selected from any of the commercially known waxes which have a melting point of from about 120° F. (48.9° C.) to about 150° F. (65.6° C.). In some embodiments, the wax has a melting point of from about 135° F. (57.2° C.) to about 145° F. (62.8° C.). Such waxes are typically of low volatility, exhibiting less than about a 10% loss in weight during standard thermogravimetric analysis. Also, the oil content of these waxes may be typically less than about 1% by weight. These waxes are of a relatively high molecular weight, having an average chain length of about 36 or more carbon atoms ($C_{36}$ or higher). The hydrocarbon wax component may comprise any wax known in the field of emulsions useful in preparing composite panels.

The linear $C_{12}$ to $C_{22}$ fatty acids that may be used with the invention include, but are not limited to lauric acid, palmitic acid, stearic acid, behenic acid, oleic acid, linoleic acid, linolenic acid and mixtures thereof. For the purposes of this application, the term "linear" as used describe the fatty acids means the carbon chains of the fatty acid are substantially linear, having less than 5 percent of the non alpha carbons in the carbon chains being substituted with a methyl or higher alkyl group.

The acids may be saturated, unsaturated or polyunsaturated.

The aqueous emulsions may optionally include an inorganic base compound. The inorganic base compound may be selected from the group consisting of sodium hydroxide, potassium hydroxide, cesium hydroxide, lithium hydroxide, ammonium hydroxide, and mixtures thereof. Any inorganic amine that is sufficiently soluble in water at a concentration sufficient to facilitate the saponification of a triglyceride may be used with embodiments of the invention.

The aqueous emulsions may optionally include an amine. For the purposes of this application, the term amine includes any compound having an amine group. In one embodiment the amine is an alkanolamine. Alkanolamines that may be useful with the invention include, but are not limited to, diethanolamine, triethanolamine and mixtures thereof. Any amine that is sufficiently soluble in water at a concentration sufficient to facilitate the saponification of a triglyceride may be used with embodiments of the invention. For example, morpholine may be used as the amine.

While not wishing to be bound by any theory, it is believed that the emulsions of the invention cause the surfactant system and hydrophilles to stabilize within the cellulose/resin/wax system or gypsum/wood fiber system, and as they dehydrate, providing a moisture resistant barrier. These emulsions may impart to the composite panels prepared therewith, one or more desirable properties such as high fluidity, foam support, bond, strength, stability, low pH, and low moisture absorption.

The emulsions useful with the invention may include the listed components in a range of concentrations. The triglycerides may be present at a concentration of from about 10 weight percent to about 50 weight percent of the emulsion. When the emulsion is prepared with no hydrocarbon waxes, the triglyceride may be present at a concentration of from about 30 weight percent to about 50 weight percent of the emulsion.

The hydrocarbon waxes may be present at a concentration of from about 0 weight percent to about 25 weight percent. In some embodiments of the invention, when a hydrocarbon wax is used, it is present at a concentration of form about 0.5 to 20 weight percent. In other embodiments of the invention, when a hydrocarbon wax is used it is present at a concentration of form about 5 to 20 weight percent.

The linear $C_{12}$ to $C_{22}$ fatty acid may be present at a concentration of from about 0.5 weight percent to about 3 weight percent. In some embodiments, the fatty acid is present at a concentration of from about 0.5 to about 2 weight percent. In still other embodiments, the fatty acid is present at a weight concentration of from about 1 to about 1.5 weight percent.

The amine may be present at a concentration of from about 0 weight percent to about 3.0 weight percent. In some embodiments, the amine is present at a concentration of from about 0.5 to about 2 weight percent. In still other embodiments, the amine is present at a weight concentration of from about 1 to about 1.5 weight percent.

The inorganic base may be present at a concentration of from about 0 weight percent to about 6.0 weight percent. In some embodiments, the inorganic base is present at a concentration of from about 0.5 to about 4 weight percent. In still other embodiments, the inorganic base is present at a weight concentration of from about 1 to about 3 weight percent.

The moisture resistant additives of the application, in some embodiments in the form of a water emulsion, may include, in addition, other compositions such as surfactants, odorants, biocides (bactericides and fungicides), stabilizers, and the like.

The emulsions may be prepared using any method known to those of ordinary skill in the art of preparing additives for use in preparing composite panels. For example, the components of the emulsion may be heated in a vessel and agitated using a suitable means of agitation. In one embodiment, the contents of the vessel are circulated through a homogenizer. In another embodiment, the contents are agitated using a high speed mixer.

Whatever method is used, the emulsions are prepared at a temperature sufficient to allow for the saponification of the triglyceride. For example, in some embodiments, the emulsions are prepared at a temperature of from about 110° F. to about 200° F. In other embodiments, a temperature of from about 120° F. to about 180° F. is used. In still another embodiment, a temperature of from about 130° F. to about 160° F. is used.

The method of the invention may be practiced to make composite panels that are prepared using wet processes and incorporating cellulose. The cellulose may be in the form of wood or it may be from another source or treated. Exemplary forms of cellulose include, but are not limited to wood fiber, wood flakes, wood strands, wood chips, wood particles, recycled wood or paper fiber, and the like. Exemplary composite panels include, but are not limited to paper boxes, oriented strand board, plywood, medium density particle board, and the like.

The method of the invention includes introducing a moisture resistance additive into a composite additive. For the purposes of the application, the term moisture means water in either liquid or vapor form.

The moisture resistance additive may be in the form of an emulsion. As such, it may be added to any of the raw materials used to prepare the panels prior to a compression and drying. For example, in an oriented strand board process, wood strands are combined with a resin and an emulsion of the invention. The wood, resin, and emulsion are admixed and formed onto a support material to from a preform. The preform is then subjected to heat and pressure to form an oriented strand board.

The emulsion may be added directly to the wood. The emulsion may be added to the binder. The emulsion may be fed into the mixer with the binder and the wood. The emulsion may be added to the board in any way that results in a relatively uniform distribution of the emulsion through the composite panel.

The emulsion of the invention may be added to a composite board composition at a weight concentration of from about 0.1 to about 5 weight percent. In some embodiments, the emulsion of the invention may be added to a composite board composition at a weight concentration of from about 0.5 to about 3 weight percent. In still other embodiments, the emulsion of the invention may be added to a composite board composition at a weight concentration of from about 1 to about 2 weight percent.

EXAMPLES

The following examples are provided to illustrate the present invention. The examples are not intended to limit the scope of the present invention and they should not be so interpreted. Amounts are in weight parts or weight percentages unless otherwise indicated.

Example 1

A first emulsion is prepared using the formulation shown in Table 1. The emulsion is prepared using a homogenizer. The components shown are as commercially available and may contain small amounts of solvents.

Example 2

A second emulsion is prepared using the formulation shown in Table 1. The emulsion is prepared using a homogenizer. Oriented strand board was manufactured by the conventional hot press method using the emulsion of Table 1. Wood strands were combined/admixed with a polymethylene diphenyldiisocyanate (pMDI) resin and about 1 weight percent of the emulsion of the invention in a mixer. The admixture, once mixed with the resin and the emulsion designated as Example 2 in Table 1, was formed onto a support material to make an oriented strand board pre-form. The pre-form was then placed on a caul plate in a hot press where the finished good is produced by applying pressures above atmospheric and temperatures greater than room temperature. The hot press method is further described in U.S. Pat. No. 4,433,120 to Shui-Tung Chiu, the contents of which are fully incorporated herein by reference. Twelve inch by twelve inch panels were cut from the finished good and tested for density, inter-board strength, moisture absorption and thickness swelling according to ASTM-D-1037-99. The results of the test are shown in Table 2.

Example 3

A third emulsion is prepared using the formulation shown in Table 1. The emulsion is prepared using a homogenizer. An oriented strand board was prepared substantially identically to that of Example 2 except that the emulsion used was that designated as Example 3 in Table 1. Twelve inch by twelve inch panels were cut from the finished good and tested for density, inter-board strength, moisture absorption and thickness swelling according to ASTM-D-1037-99. The results of the tests are shown in Table 2.

Comparative Example 4

A fourth emulsion is prepared using the formulation shown in Table 1. The emulsion is prepared using a homogenizer. An oriented strand board was prepared substantially identically to that of Example 2 except that the emulsion used was that designated as Comparative Example 4 in Table 1. Twelve inch by twelve inch panels were cut from the finished good and tested for density, inter-board strength, moisture absorption and thickness swelling according to ASTM-D-1037-99. The results of the tests are shown in Table 2.

TABLE 1

| | Example # | | | |
|---|---|---|---|---|
| | 1 | 2 | 3 | Comparative 4 |
| Beef Tallow | 43 | 33 | 20 | 0 |
| Hydrocarbon Wax | 0 | 10 | 20 | 47 |
| Stearic Acid | 1.5 | 1.5 | 1.5 | 1.7 |
| Triethyl Amine | 1.3 | 1.3 | 1.3 | 1.4 |
| KOH | 0.5 | 0 | 0 | 0 |
| Water | 53.7 | 54.2 | 57.2 | 49.9 |

TABLE 2

| Example # | Solids Weight Percent of Emulsion | Density (pcf) | IB (PSI) | MA (%) | TS (%) |
|---|---|---|---|---|---|
| 2 | 44.5* | 40.95 | 64.93 | 32.3 | 14.3 |
| 3 | 42.85* | 38.29 | 53.14 | 30.6 | 13.5 |
| Comparative 4 | 50.00* | 40.64 | 71.57 | 28.0 | 11.8 |

*Note:
Solids contents varies slightly from formulation due to the presence of solvents in some of the formulations components.

DISCUSSION OF THE EXAMPLES

An oriented strand board was prepared using two formulations of the invention and compared to a board prepared using a conventional moisture resistance additive. As can be seen from Table 2, the Examples had physical properties similar to the Comparative Example's despite having about 9% and 12% percent fewer solids. Example 3, despite having a significantly lower density than the Comparative Example, also had good physical properties. As this field is very price competitive, a reduction in raw materials costs may be very significant.

What is claimed is:
1. A composite panel prepared using a moisture resistance additive useful for preparing composite panels, the composite panel comprising:
    gypsum, cellulose, or combinations thereof; and the moisture resistance additive, wherein the moisture resistance additive was provided as an emulsion comprising:
   from 10 to 50 weight percent of a triglyceride having a saponification value of at least 150 and an iodine value of at least 35;
   from 0.5 to 20 weight percent of a hydrocarbon wax;
   from 0.5 to 3 weight percent of a linear $C_{12}$ to $C_{22}$ fatty acid; and
   a compound or compounds selected from the group consisting of an amine, an inorganic base, and mixtures thereof, wherein the amine, when present, comprises from 0.5 to 3 weight percent of the emulsion, and wherein the inorganic base, when present comprises from 0.5 to 6 weight percent of the emulsion, and
   water; and wherein the emulsion is prepared under conditions sufficient to disperse components of the formulation and at least partially saponify the triglyceride.

2. The composite panel of claim 1 wherein the composite panel is a paper box, an oriented strand board, plywood, a gypsum board, or a medium density particle board.

3. The composite panel of claim 1 wherein the cellulose is selected from the group consisting of wood fiber, wood flakes, wood strands, wood chips, wood particles, recycled wood, recycled paper fiber, and mixtures thereof.

4. A method for preparing composite panels comprising introducing a moisture resistance additive useful for preparing composite panels into a composite panel, the moisture resistance additive comprising:
   from 10 to 50 weight percent of a triglyceride having a saponification value of at least 150 and an iodine value of at least 35;
   from 0.5 to 20 weight percent of a hydrocarbon wax;
   from 0.5 to 3 weight percent of a linear $C_{12}$ to $C_{22}$ fatty acid;
   a compound or compounds selected from the group consisting of an amine, an inorganic base, and mixtures thereof, wherein the amine, when present, comprises from 0.5 to 3 weight percent of the emulsion, and wherein the inorganic base, when present, comprises from 0.5 to 6 weight percent of the emulsion; and
   water; and wherein the emulsion is prepared under conditions sufficient to disperse components of the formulation and at least partially saponify the triglyceride.

5. The method of claim 4 wherein the moisture resistance additive is a water emulsion.

6. The method of claim 5 wherein the moisture resistance additive is introduced into the composite panel by applying the moisture resistance additive to a cellulose component used to make the composite panel.

7. A moisture resistance additive useful for preparing composite panels comprising a triglyceride having a saponification value of at least 150 and an iodine value of at least 35, wherein the moisture resistance additive is in the form of an emulsion and comprises:
   from 10 to 50 weight percent of the triglyceride having the saponification value of at least 150 and the iodine value of at least 35;
   from 0.5 to 20 weight percent of a hydrocarbon wax;
   from 0.5 to 3 weight percent of a linear $C_{12}$ to $C_{22}$ fatty acid;
   a compound or compounds selected from the group consisting of an amine, an inorganic base, and mixtures thereof, wherein the amine, when present, comprises from 0.5 to 3 weight percent of the emulsion, and wherein the inorganic base, when present, comprises from 0.5 to 6 weight percent of the emulsion; and
   water.

8. The moisture resistance additive of claim 7 wherein the emulsion is prepared using a homogenizer.

9. The moisture resistance additive of claim 7 wherein the emulsion is heated to a temperature sufficient to at least partially saponify the triglyceride.

10. The moisture resistance additive of claim 7 wherein the temperature sufficient to at least partially saponify the triglyceride is from about 110° F. to about 200° F.

11. The moisture resistance additive of claim 7 additionally comprising a component selected from the group consisting of surfactants, odorants, biocides, stabilizers, and mixtures thereof.

12. A moisture resistance additive comprising an emulsion, wherein the emulsion is prepared using a formulation comprising:
   from 10 to 50 weight percent of a triglyceride having a saponification value of at least 150 and an iodine value of at least 35;
   from 0.5 to 20 weight percent of a hydrocarbon wax;
   from 0.5 to 3 weight percent of a linear $C_{12}$ to $C_{22}$ fatty acid; and
   a compound or compounds selected from the group consisting of an amine, an inorganic base, and mixtures thereof, wherein the amine, when present, comprises from 0.5 to 3 weight percent of the emulsion, and wherein the inorganic base, when present, comprises from 0.5 to 6 weight percent of the emulsion; and
   water, and wherein the emulsion is prepared under conditions sufficient to disperse components of the formulation and at least partially saponify the triglyceride.

13. The moisture resistance additive of claim 12 wherein the formulation additionally comprises a component selected from the group consisting of surfactants, odorants, biocides, stabilizers, and mixtures thereof.

14. The moisture resistance additive of claim 12 wherein the emulsion is dispersed using a homogenizer.

* * * * *